United States Patent
Faucher et al.

(10) Patent No.: US 6,578,155 B1
(45) Date of Patent: Jun. 10, 2003

(54) DATA PROCESSING SYSTEM WITH ADJUSTABLE CLOCKS FOR PARTITIONED SYNCHRONOUS INTERFACES

(75) Inventors: Marc R. Faucher, South Burlington, VT (US); Jack R. Smith, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/526,854

(22) Filed: Mar. 16, 2000

(51) Int. Cl.[7] .................................................. G06F 1/06
(52) U.S. Cl. ........................................ 713/501; 713/503
(58) Field of Search ................................. 713/400, 401, 713/500, 501, 503, 601

(56) References Cited

U.S. PATENT DOCUMENTS

| | | | |
|---|---|---|---|
| 3,715,729 A | 2/1973 | Mercy | 340/172.5 |
| 4,979,191 A | 12/1990 | Bond et al. | 375/357 |
| 5,305,452 A * | 4/1994 | Khan et al. | 713/400 |
| 5,412,311 A | 5/1995 | Rothermel | 324/76.82 |
| 5,511,212 A | 4/1996 | Rockoff | 395/800 |
| 5,680,594 A * | 10/1997 | Charneski et al. | 713/501 |
| 5,717,697 A | 2/1998 | Yin | 371/21.5 |
| 5,790,609 A | 8/1998 | Swoboda | 375/357 |
| 5,799,176 A | 8/1998 | Kapusta et al. | 395/556 |
| 5,815,693 A * | 9/1998 | McDermott et al. | 713/501 |
| 5,838,339 A | 11/1998 | Silverbrook | 347/9 |
| 5,903,746 A * | 5/1999 | Swoboda et al. | 713/501 |
| 5,926,053 A * | 7/1999 | McDermott et al. | 327/298 |
| 5,978,926 A * | 11/1999 | Ries et al. | 713/501 |
| 5,987,620 A * | 11/1999 | Tran | 713/600 |

* cited by examiner

Primary Examiner—Dennis M. Butler
(74) Attorney, Agent, or Firm—Downs Rachlin Martin PLLC

(57) ABSTRACT

A data processing system (20) having a synchronous interface and partitioned clock and I/O logic controller structure. The system includes a plurality of processing components (22), each having a plurality of I/O logic controllers (24). In addition, the system includes a plurality of clock sources (30) for providing clock signals and a plurality of multiplexers (36) connected to said plurality of clock sources and to at least two of said I/O logic controllers. The clock signals differ from one another in frequency or in skew, i.e., time delay. By appropriate control of clock select registers connected to the plurality of multiplexers, one of the plurality of clock signals from the clock sources may be provided to the two or more I/O logic controllers connected to a given multiplexer. This permits different groups of I/O logic controllers to receive different clock signals in parallel. As a consequence, the signal interface for the system is partitioned into multiple group with each group controlled by a separate clock.

14 Claims, 4 Drawing Sheets

DATA PROCESSING SYSTEM WITH ADJUSTABLE CLOCKS FOR PARTITIONED SYNCHRONOUS INTERFACES

FIELD OF THE INVENTION

The present invention pertains to a data processing system and, more particularly, to an apparatus and method for partitioning a signal interface into multiple groups, each controlled by a separate clock.

BACKGROUND OF THE INVENTION

Known data processing systems typically include one or more processing components that have a defined signal interface and protocol to facilitate communication with other components. In most cases, the interface is controlled by a single, fixed synchronous clock. A single clock keeps the design simple, but limits the ability to isolate timing problems, recover from errors, manage power and otherwise run certain interfaces at different frequencies than other interfaces.

The use of multiple clocks in data processing systems is known. For example, U.S. Pat. No. 5,790,609 to Swoboda discloses a data processing system featuring multiple clock inputs delivered to a single multiplexer. When it is desirable to run the data processing system at a slower rate, for example to conserve power, then instructions are generated causing the multiplexer to change its clock output from a faster clock input to a slower clock input. Unfortunately, providing only a single clock output at different selectable frequencies does not address the need to provide certain input/output signals within a data processing system at one frequency or skew and other input/output signals at a different frequency or skew.

SUMMARY OF THE INVENTION

One aspect of the present invention is a data processing system comprising a plurality of processing components, each connected to at least one other of the processing components. The system also includes a plurality of clock sources, each providing a clock signal, and a plurality of controllers associated with each of the processing components. In addition, the system includes a plurality of clock select registers, each providing a clock select signal, and a plurality of multiplexers, each connected to the plurality of clock sources, to two or more of the plurality of controllers, and to one of the clock select registers. Each of the multiplexers provides as an output to the two or more of the plurality of controllers one of the clock signals in response to a clock select signal provided by the one clock select register.

Another aspect of the present invention is a method of providing clock signals in a data processing system having a plurality of processing components and a plurality of controllers associated with the processing components. As the first step in the method, a plurality of different clock signals is provided. Next, one of the plurality of clock signals is selected for each of the plurality of controllers. Finally, the selected ones of the plurality of clock signals is provided to the plurality of controllers in parallel.

DETAILED DESCRIPTION OF THE INVENTION

Figure 1:
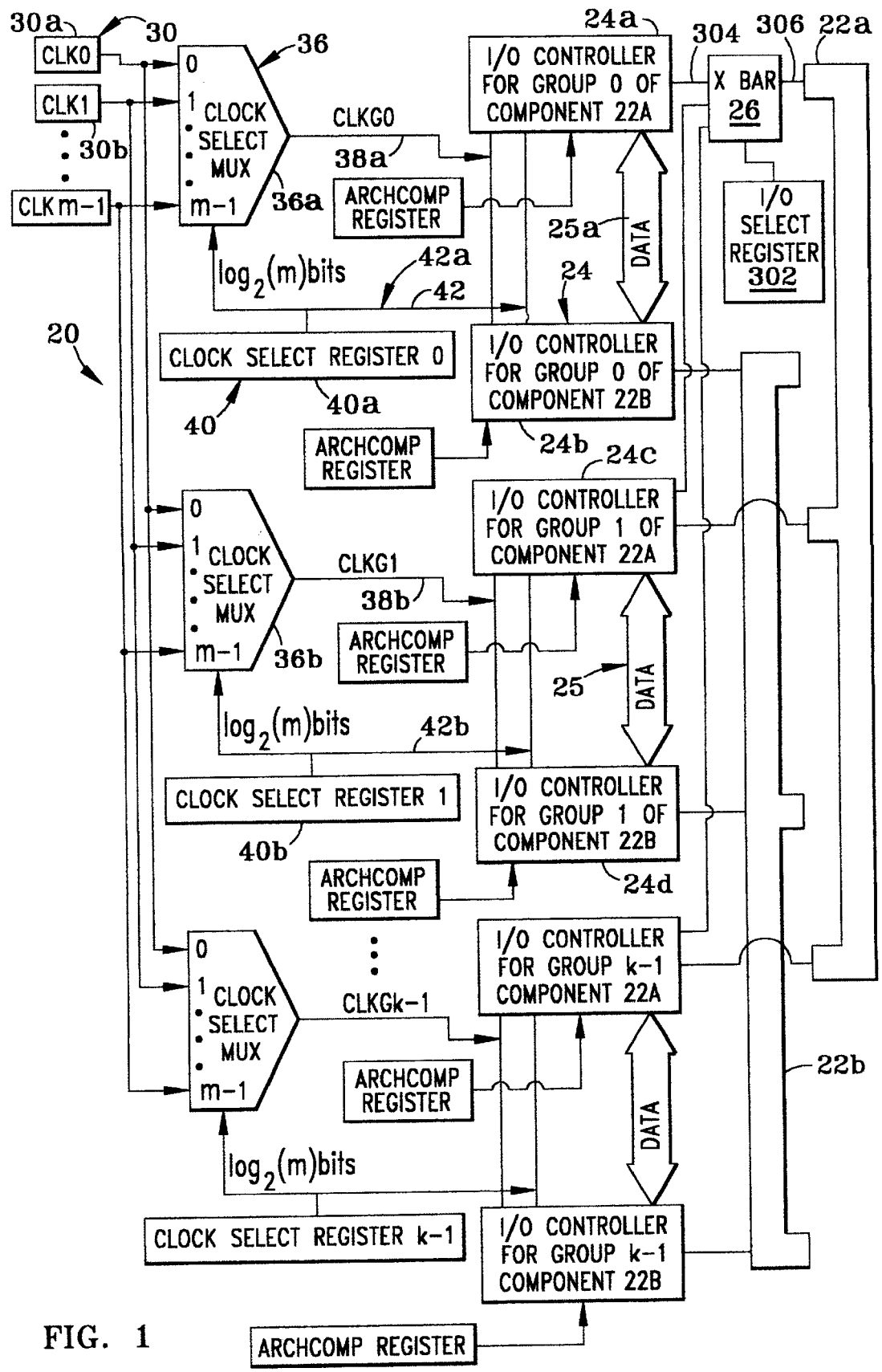
FIG. 1 is a block diagram of the data processing system of the present invention.

Referring to FIG. 1, the present invention is a data processing system 20 having a synchronous interface. System 20 may take the form of a higher level assembly such as a motherboard, or may be a single semiconductor chip containing multiple logic devices.

System 20 includes a plurality of processing components 22 such a memory, logic, peripherals and other devices controlled by the synchronous interface of the system. When system 20 is a higher level assembly, processing components 22 typically constitute separate semiconductor chips, such a microprocessor chip and a memory chip.

The interface signal, e.g., input, output, BIDI signals, to each processing component 22 is divided into a plurality of groups, each containing 1 to n bits, where n is the total number of bits in the interface signal. Components 22 include a plurality of logic controllers 24, one for each interface signal group. For example, controller 24a is provided for group 0 of processing component 22a, controller 24b is provided for group 0 of processing component 22b, controller 24c is provided for group 1 of processing component 22a and controller 24d is provided for group 1 of processing component 22b.

Typically, controllers 24 are part of components 22, although they may be separate devices connected to the components. Controllers 24 include the logic necessary for controlling data I/O for the component 22 with which they are associated. Each controller 24 for a given component 22 provides data over data bus 25 to a controller for another component 22. For example, controller 24a provides data over data bus 25a to controller 24b. It is via data bus 25 that components 22 are connected to one another.

Several approaches exist for dividing the interface signal into appropriate groups, and hence for determining the number of controllers 24, and multiplexers 36 to which the controllers are connected. Each interface group may be, for example, the pin or pins of a microprocessor, a memory chip or other device. Such pin(s) may be hardwired to an associated controller 24. As an alternative, such pins, or any selected bytes in the system interface signal, e.g., bytes 0 and 1, may be assigned to a first controller 24, with other bytes, e.g., bytes 2–7, being assigned to a second controller, and so on. Typically, each byte identifies 8 bits, i.e., pins. This assignment is achieved by either hardwiring a given controller 24 to associated pins or through the use of optional cross-bar switch 26 connected to the controllers 24 for a given component 22. Cross-bar switch 26 is described in more detail below.

System 20 also includes a plurality of clock sources 30, each for providing a clock signal CLK that differs from the clock signals provided from other clock sources. Clock signals CLK may differ by frequency or skew, i.e., time delay. For example, clock source 30a may provide a clock signal CLK0 that is half the frequency of clock signal CLK1 provided by clock source 30b. Alternatively, clock source 30a may provide a clock signal CLK0 that is the same frequency as the clock signal CLK1 from clock source 30b, but is delayed in time, e.g., by 100 picoseconds, relative to clock signal CLK1.

System 20 also includes a plurality of multiplexers 36, each connected to all of clock sources 30. Thus, the clock signals CLK from all of clock sources 30 are the inputs to multiplexers 36. The output of each multiplexer 36 is connected via a communication line 38 to two or more controllers 24. For example, the output of multiplexer 36a is provided via communication line 38a to controllers 24a and 24b. In some cases it may be desirable to connect the output of a given multiplexer 36 to more than two controllers 24. Regardless of the number of controllers 24 connected to a given multiplexer 36, each controller is connected to only one multiplexer.

The operation of each multiplexer 36 is controlled by a separate clock select register 40. System 20 may include clock select registers 40 either inside each controller 24 (one in each) or outside the controller 24 (one for each I/O group). In either case, clock select register 40 chooses one of clock sources 30 to be used by a given multiplexer 36. For example, clock select register 40a may select clock signal CLK0 from clock source 30a as the output of multiplexer 36a, and clock select register 40b may select clock signal CLK1 as the output of multiplexer 36b.

Clock select register 40 is programmed using an instruction WRCLK, which is an extension to the architecture of the processing component 22 connected to the controller 24 that is connected to the multiplexer 36 to which the clock select register is connected. The WRCLK instruction has two operands, the first operand identifies which group is selected and the second operand selects the clock for that group. When the WRCLK instruction is executed it writes into clock select register 40, in a first bus cycle, a binary value identifying which one of clock sources 30 input to multiplexer 36 should be provided as the output from the multiplexer. In a second bus cycle, the new value in clock select register 40 propagates to multiplexer 36, thereby determining which one of clock sources 30 is selected. Another instruction RDCLK allows the contents of a particular clock select register 40 to be read by the processing component 22. The RDCLK instruction is also an extension to the architecture of the respective processing component 22.

Instructions WRCLK and RDCLK may be executed at any time to change the clock signal CLK provided to a given controller 24, i.e., to a given signal interface group. Thus, as discussed in more detail below, interfaces as narrow as one bit and as wide as the entire signal interface may be controlled.

The contents of each clock select register 40 are also provided via line 42 to the controllers 24 connected to the multiplexer 36 to which the clock select register is connected. For example, the output of clock select register 40a is provided via line 42a to controllers 24a and 24b connected to multiplexer 36a. Clock select register 40 provides its output to the controllers 24 connected to the multiplexer to which the clock select register is connected, in addition to the multiplexer itself, to enable the controllers to adjust their internal operation to conform with the system interface protocol in view of the specific clock signal the controllers are receiving.

System 20 also preferably includes an archcomp register 50. This register is programmed using the ARCHCOMP instruction, typically represented by one bit. The ARCHOMP instruction tells controllers 24, and hence the interface groups with which the controllers are associated, whether or not they need to maintain the architected interface protocol of system 20 when clock signals CLK of different frequency or skew are provided to controllers 24. For example, if system 20 is being operated for manufacturing component test, it may not be necessary or desirable to conform to the architected interface protocol. On the other hand, when system 20 is used in a higher level of integration that relies on its architectual specification, such as a processor chip integrated on a mother board, it will be necessary to maintain protocol. Like clock select register 40, archcomp register 50 may be implemented inside each I/O controller 24 or outside of these controllers. When implemented such that an archcomp register 50 is provided for each controller 24, the ARCHCOMP instruction is added to the instruction set of the processing component 22 connected to the controllers 24 to which the archcomp register is connected.

The ARCHCOMP instruction executes in a similar manner as the WRCLK instruction. After instruction decode the processing component 22 waits for pending bus cycles to complete and then executes ARCHCOMP in two bus cycles. These two cycles are ARCHCOMP BUS CYCLE 1, where a new value is written into archcomp register 50, and ARCHCOMP BUS CYCLE 2, where the new value propagates to the logic in I/O controller 24 causing a change in its behavior. The behavior of I/O controller 24 does not change until the completion of ARCHCOMP BUS CYCLE 2.

Figure 2:
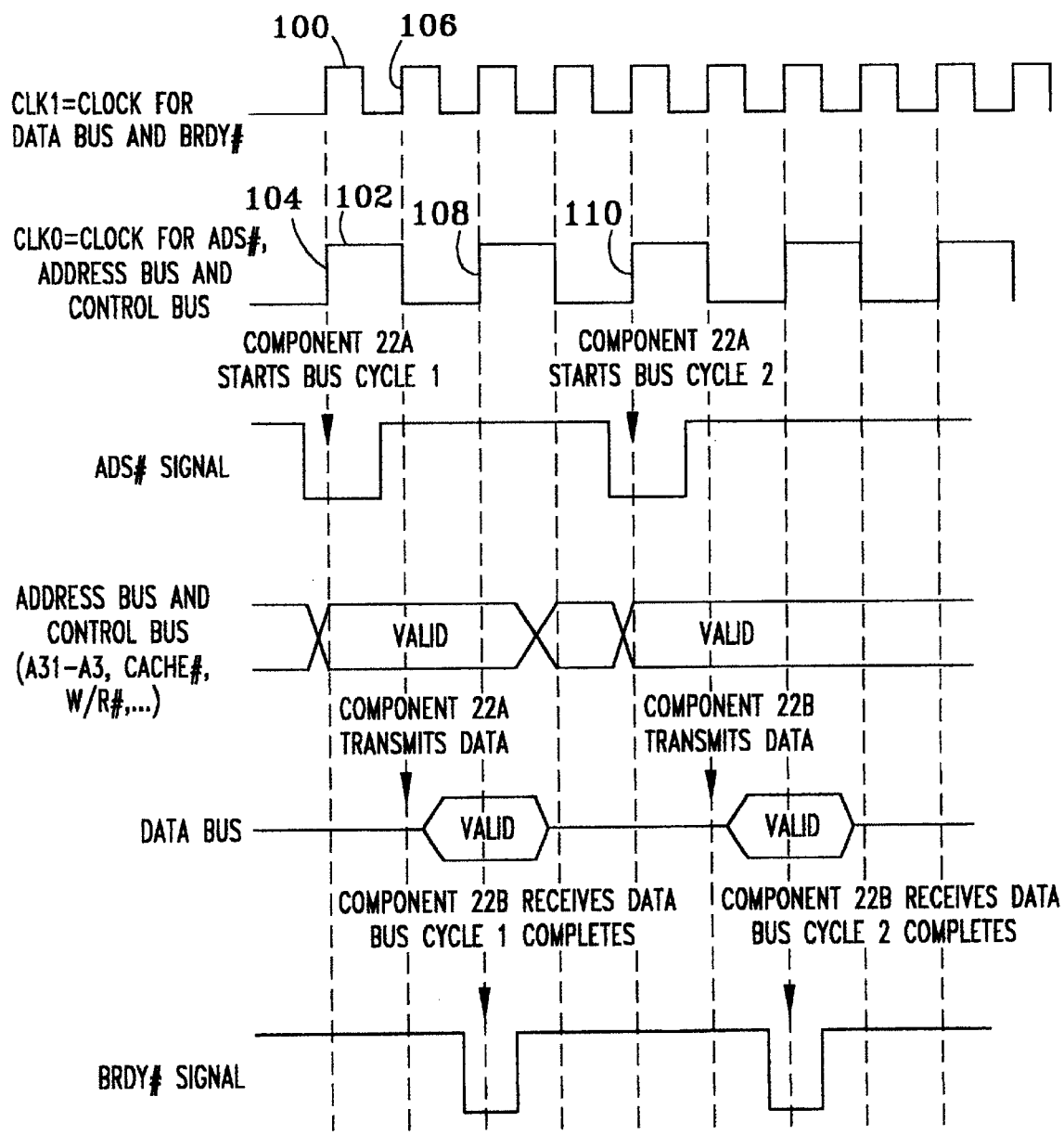
FIG. 2 is a timing diagram illustrating operation of the system of FIG. 1, where data is written with the data bus clocked at twice the frequency of the address bus and control bus.

Referring to FIGS. 1 and 2, an example of the manner in which system 20 may be used to transfer data from component 22a to component 22b is now provided. In this example, data is sent faster using the partitioned clock signals of system 20 than it would otherwise be sent if a single clock signal was used. Assume clock source 30b provides a clock signal CLK1, identified by waveform 100 in FIG. 2, that has a frequency that is twice that of clock signal CLK0, identified by waveform 102, provided by clock source 30a. Also assume that clock signal CLK1 is output from a multiplexer 36 connected to controllers 24 for the data bus and BRDY signal (which acknowledges receipt of data) for system 20. Further assume that clock signal CLK0 is output from a different multiplexer 36 connected to controllers 24 for the address bus, for the ADS# signal (which starts a new bus cycle) and for the control bus for system 20.

Data transfer proceeds as follows. At leading edge 104 of waveform 102 component 22a starts its first bus cycle, where address and control bus information for the data in component 22a to be delivered to component 22b is provided. Following receipt of a request for this data, at leading edge 106 of waveform 100 the requested data is provided by component 22a. Because clock signal CLK1 provided to the data bus operates at twice the frequency of the clock signal CLK0 provided to the address and control buses, the data can be received by component 22b by the leading edge 108 of the next cycle of waveform 102, thereby completing the first bus cycle. If the data bus was not clocked at twice the frequency as the address bus, then data would not be received by component 22b until leading edge 110 of the third cycle of waveform 102. This provides a substantial performance improvement.

Yield variations in the manufacture of semiconductor chips often result in demotion of given chips to a slower speed sort category. In many occasions only one or two critical paths operate slower than the rest of the chip. The present invention can be used to promote such chips to a higher speed sort category, hence increasing their value, by providing a mechanism to break the interface into groups whereby the critical signals are allowed to operate at a slower rate than the others, or the same rate but with a later skew. This is achieved by putting the critical signals into a separate group and using the WRCLK instruction to select a different clock source 30 than is used for the other I/O signals on this chip. This concept can also be applied to debugging timing problems on motherboards, where the arrival time of the clock signal at a component pin is adjusted by selecting a different clock source 30 of which all are the same frequency but have different skew.

Figure 3:
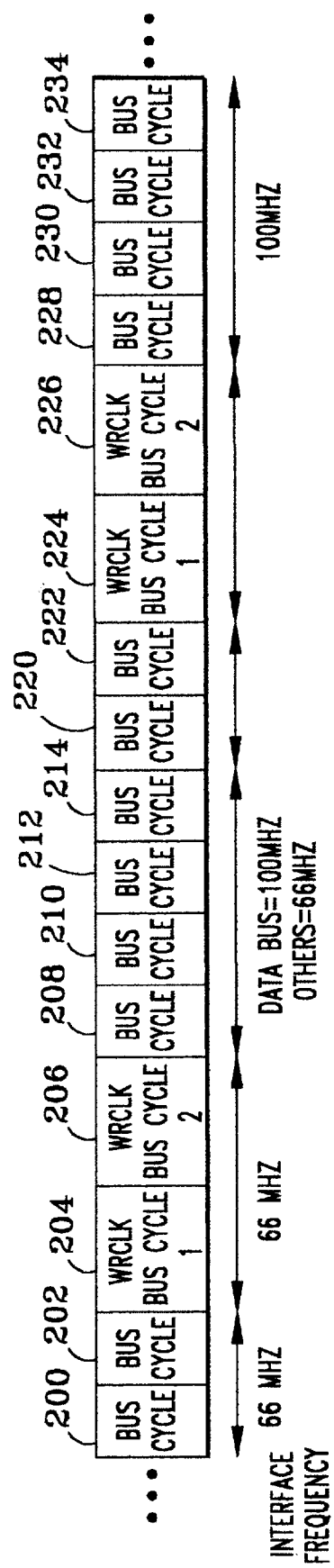
FIG. 3 is a timing diagram illustrating change in clock frequency for various components over time in response to the WRCLK instruction.

Turning now to FIGS. 1 and 3, the manner in which execution of the WRCLK and RDCLK clock signals determines the instructions sent to clock select registers 40, and hence selection of which clock signal CLK from clock sources 30 input to a multiplexer 36 will be provided as the output from the multiplexer, will be discussed. The WRCLK instruction is detected by a processing component 22 at instruction decode. Thus, at bus cycle 200 component 22 decodes the WRCLK instruction. Next, at cycle 202 component 22 waits for all pending bus cycles to complete. A single bus cycle illustrated in FIG. 3 may represent multiple clock cycles. Then, at cycle 204, component 22 executes the WRCLK instruction causing a value representative of the desired clock signal CLK to be written into the appropriate clock select register 40. At cycle 206, the new value written into the clock select register is allowed to propagate to the clock select multiplexer 36 and hence a new clock source 30 is selected to control I/O controller 24. Assuming the WRCLK instruction was provided to a clock select register 40 connected to a multiplexer 36 connected to controllers 24 for a data bus, and data was being provided at a clock speed of 66 MHz, the propagation of the new value of the clock select register 40 at cycle 208 causes data to be provided at a new clock speed, in this example, 100 MHz. Other controllers 24 continue to receive clock signals at 66 MHz.

Continuing the example illustrated in FIG. 3, and assuming it is desired to provide 100 MHz clock signals to all groups, and hence associated controllers 24, in system 20, at cycle 220 the WRCLK instruction is decoded, as occurred at cycle 200. Next, at cycle 222 the WRCLK instruction is decoded, as occurred at cycle 202. Then, the WRCLK instruction executes at cycles 224 and 226, respectively, like at cycles 204 and 206. Finally, all other groups receive clock signals at 100 MHz, as represented by bus cycles 228–234.

Yet another application for system 20 is to provide different clock signals to different bytes or bits of the interface signal. This functionality of system 20 has particular application in test, debug and recovery operations. Turning again to FIG. 1, to achieve this functionality system 20 may optionally include cross-bar switch 26, as noted above, and I/O select register 302 connected to the cross-bar switch. The latter connects each one of multiple inputs to a selected one or ones of multiple outputs, and may constitute structure other than a cross-bar switch per se. For example, various arrangements of multiplexers and/or other devices may be used as cross-bar switch 26.

In any event, each controller 24 for a given component 22 is connected via line 304 to a cross-bar switch 26. In FIG. 1 only one cross-bar switch 26 has been shown to simplify illustration. However, because two components, i.e., components 22a and 22b, are shown, two cross-bar switches 26 would typically be used, one connected to the controllers 24 of component 22a and the other connected to the controllers 24 of component 22b. Cross-bar switch 26 is typically part of a component 22, although it may be implemented as a separate device.

Cross-bar switch 26 assigns the pin or pins for which a given controller 24 controls data input and output over data bus 25. To achieve maximum flexibility, one controller 24 is provided for each pin on component 22. However, in many applications fewer controllers 24 than the number of pins on component 22 may be used, i.e., each controller may control data I/O over multiple pins. In this regard, line 304 generally includes a plurality of lines, one for each pin on component 22.

I/O select register 302 contains instructions that, when propagated into cross-bar switch 26, determine which pins on controller 24 will provide data. An extension to the instruction set for component 22 called IOSELECT provides such instructions.

Figure 4:
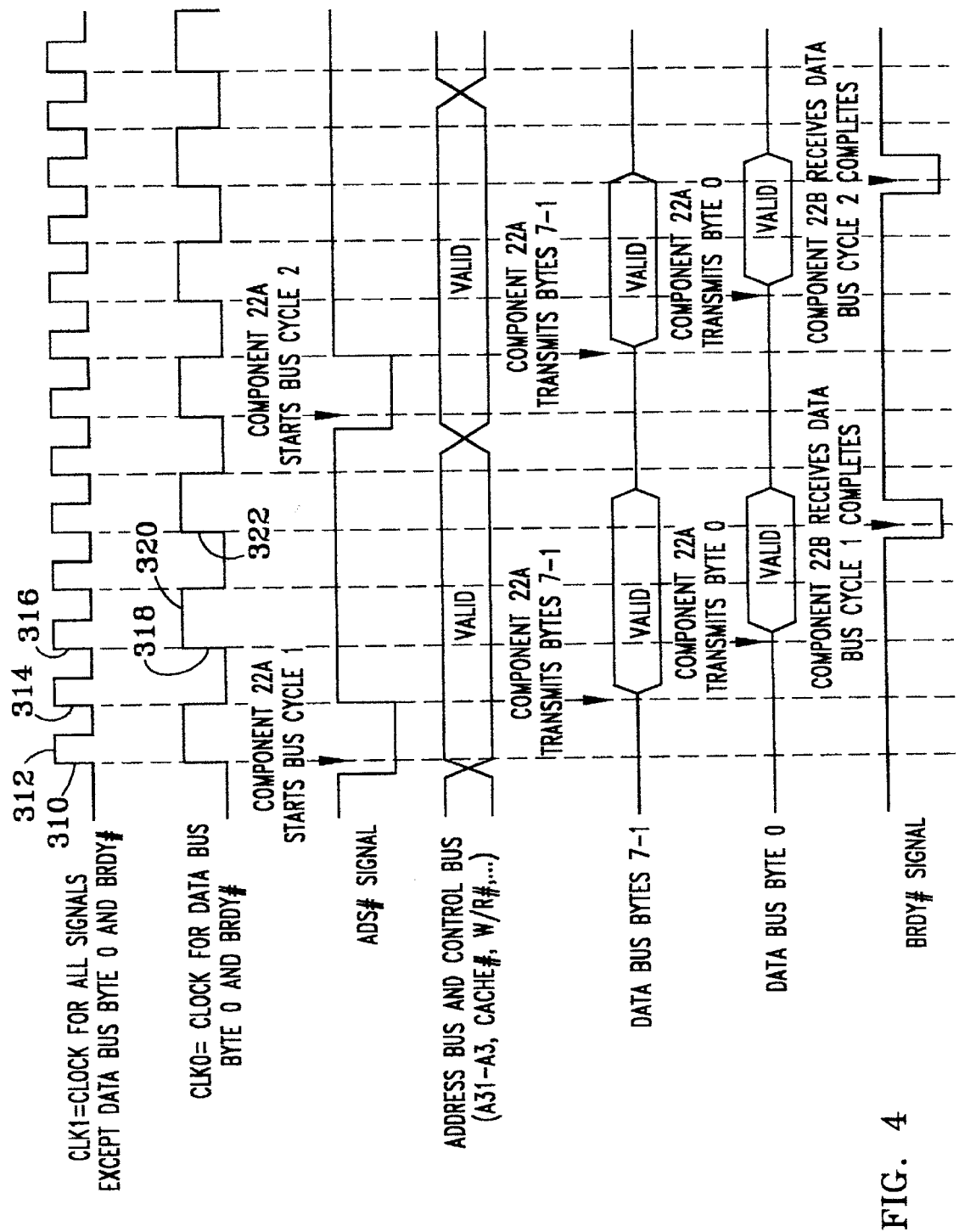
FIG. 4 is a timing diagram illustrating operation of the system of FIG. 1, where data is written with data bus byte 0 operating at half the frequency of other interface signals.

With reference now to FIGS. 1 and 4, the added functionality that cross-bar switch 26 and I/O select register 302 provides will now be described in the context of data transfer from component 22a to 22b. For the purpose of the following discussion, assume the clock signals provided to eight pins on component 22a, each represented by an associated byte, are to be selected in accordance with the present invention. Assume also I/O select register 302 contains an instruction that causes cross-bar switch 26 to assign pins represented by byte 0 to controller 24a, which receives the clock signal CLK0 from clock source 30a, and assigns bytes 7–1 to controller 24c, which receives clock signal CLK1 from clock source 30b. Further assume the frequency of the clock signal CLK0 from clock source 30a is half the frequency of the clock signal CLK1 from clock source 30b. As described below, because bytes 7–1 are clocked at a faster rate component 22a transmits data on pins represented by these bytes earlier than data on pins represented by byte 0. This approach can be used, for example, during system debug to isolate timing problems to byte 0 pins.

At leading edge 310 of waveform 312, the bus cycle for component 22a begins. At leading edge 314 of waveform 312, data on pins represented by bytes 7–1 is transmitted by component 22a. Component 22b receives this data at leading edge 316 of waveform 312. Then, at leading edge 318 of waveform 320, data on pins identified by byte 0 is transmitted by component 22a. Finally, at leading edge 322 of waveform 320, component 22b receives this data. This completes the first bus cycle. This process is repeated in a second bus cycle, as illustrated in FIG. 4, and may be repeated again as desired.

Because data provided from the pins of component 22a identified by byte 0 is transmitted with clock signal CLK0, which is half the frequency of clock signal CLK1, more time exists to examine byte 0 data. This ability to slow down the delivery of data for selected pins is useful, for example, to isolate timing problems that may exist with respect to data provided on such pins.

While the present invention has been described in terms of preferred embodiments and working examples, it should be understood that it is not so limited. On the contrary, it is intended to cover all alternatives, modifications and equivalents as may be included within the spirit and scope of the invention as defined in the appended claims.

What is claimed is:

1. A data processing system comprising:
   a. a plurality of processing components, each connected to at least one other of said processing components;
   b. a plurality of clock sources, each providing a clock signal;
   c. a plurality of controllers associated with each of said processing components;
   d. a plurality of clock select registers, each providing a clock select signal; and
   e. a plurality of multiplexers, each connected to said plurality of clock sources, to two or more of said plurality of controllers, and to one of said clock select registers, each of said multiplexers providing as an output to said two or more of said plurality of controllers one of said clock signals in response to a clock select signal provided by said one clock select register.

2. A system according to claim 1, further including a plurality of communication lines, wherein each of said plurality of multiplexers is connected via one of said plurality of communication lines to said two or more of said plurality of controllers.

3. A system according to claim 2, wherein each one of said plurality of communication lines is uniquely connected to said two or more of said plurality of controllers.

4. A system according to claim 1, wherein at least one of said clock signals is offset in time from other ones of said clock signals.

5. A system according to claim 1, wherein at least one of said clock signals has a different frequency than other ones of said clock signals.

6. A system according to claim 1, the system having a communication sequence protocol and further including an archcomp register connected to each of said plurality of controllers for indicating if said plurality of processing components must comply with said communication sequence protocol.

7. A system according to claim 6, wherein each of said plurality of controllers includes an archcomp register.

8. A system according to claim 6, wherein said archcomp register is designed to be written, in response to an ARCHCOMP instruction in a first bus cycle, with a first value when compatibility is desired and with a second value when compatibility is not desired, and said archomp register is designed so that the one of said first value and said second value present in said archcomp register propagates, in response to said ARCHCOMP instruction in a second bus cycle, to said controllers connected to said archcomp register, further wherein said ARCHCOMP instruction is executed on said plurality of processing components.

9. A system according to claim 1, wherein said each of said plurality of clock select registers is designed to be uniquely written, in response to a WRCLK instruction in a first bus cycle, with a value indicating the one of said plurality of clock sources having a clock signal to be provided as an output from the one of said plurality of multiplexers to which said each clock select register is connected, and said clock select registers are designed so that said value propagates, in response to said WRCLK instruction in a second bus cycle to said multiplexer with which said each clock select register is connected, further wherein said WRCLK instruction is executed on said plurality of processing components.

10. A system according to claim 1, wherein said clock select register is designed so that contents thereof may be read via a RDCLK instruction.

11. A system according to claim 1, wherein each of said plurality of processing components has a plurality of pins via which data is input and output and each of said plurality of controllers controls said input and output of data for selected ones of said plurality of pins, further wherein said system includes means connected to said plurality of controllers for assigning said selected ones of said plurality of pins to associated ones of said plurality of controllers.

12. A system according to claim 1, further including a cross-bar switch connected to said plurality of controllers associated with one of said plurality of processing components and an I/O select register connected to said cross-bar switch for providing instructions defining operation of said cross-bar switch.

13. A system according to claim 12, wherein said system is designed to provide an IOSELECT instruction and said instructions in said I/O select register are determined by said IOSELECT instruction.

14. A method of providing clock signals in a data processing system having a plurality of processing components, each of the processing components including a plurality of pins for controlling input and output of data, and a plurality of controllers associated with the processing components, the method comprising the steps of
 a. providing a plurality of different clock signals;
 b. selecting one of said plurality of clock signals for each of said plurality of controllers; and
 c. providing said selected ones of said plurality of clock signals to said plurality of controllers in parallel and assigning selected ones of said plurality of pins to associated ones of said plurality of processing components.

\* \* \* \* \*